United States Patent
Osaki et al.

(10) Patent No.: US 9,465,243 B2
(45) Date of Patent: Oct. 11, 2016

(54) LIQUID CRYSTAL DISPLAY DEVICE AND METHOD OF MANUFACTURING LIQUID CRYSTAL DISPLAY DEVICE

(71) Applicant: Mitsubishi Electric Corporation, Tokyo (JP)

(72) Inventors: Hiroshi Osaki, Kumamoto (JP); Akinori Sumi, Kumamoto (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/985,876

(22) Filed: Dec. 31, 2015

(65) Prior Publication Data
US 2016/0116793 A1  Apr. 28, 2016

Related U.S. Application Data

(62) Division of application No. 14/223,993, filed on Mar. 24, 2014, now Pat. No. 9,285,620.

(30) Foreign Application Priority Data

Mar. 27, 2013 (JP) ................................. 2013-065415

(51) Int. Cl.
*G02F 1/1339* (2006.01)
*G02F 1/1333* (2006.01)
*G02F 1/1341* (2006.01)

(52) U.S. Cl.
CPC ....... *G02F 1/133351* (2013.01); *G02F 1/1339* (2013.01); *G02F 1/1341* (2013.01); *G02F 1/13394* (2013.01); *G02F 2001/133302* (2013.01)

(58) Field of Classification Search
CPC .................................................. G02F 1/13394
See application file for complete search history.

(56) References Cited

U.S. PATENT DOCUMENTS

| | | | |
|---|---|---|---|
| 6,636,192 B1 | 10/2003 | Saitoh | |
| 7,683,993 B2 | 3/2010 | Ishitani | |
| 7,940,360 B2 | 5/2011 | Ishitani | |
| 8,467,013 B2 | 6/2013 | Gourlay | |
| 2006/0203168 A1 | 9/2006 | Ishitani | |
| 2009/0059126 A1* | 3/2009 | Koganezawa | .... G02F 1/133611 349/64 |
| 2009/0316080 A1 | 12/2009 | Uehara et al. | |
| 2011/0205475 A1 | 8/2011 | Ishitani | |

FOREIGN PATENT DOCUMENTS

| | | |
|---|---|---|
| JP | 2001-166121 A | 6/2001 |
| JP | 2003-215622 A | 7/2003 |
| JP | 2006-268020 A | 10/2006 |
| WO | 00/45360 A1 | 8/2000 |

* cited by examiner

*Primary Examiner* — Timothy L Rude
(74) *Attorney, Agent, or Firm* — Studebaker & Brackett PC

(57) ABSTRACT

Provided is a liquid crystal display device including: a CF substrate; a TFT substrate disposed at a position facing the CF substrate; a transfer member provided at a corner portion in a bezel region of the TFT substrate; a spacer member for maintaining a distance between the CF substrate and the TFT substrate within a predetermined range; and a cutting mark made of the same material as that of the spacer member, and disposed on the CF substrate between a cutting line for the CF substrate from a mother CF substrate and the transfer member.

4 Claims, 5 Drawing Sheets

F I G . 3
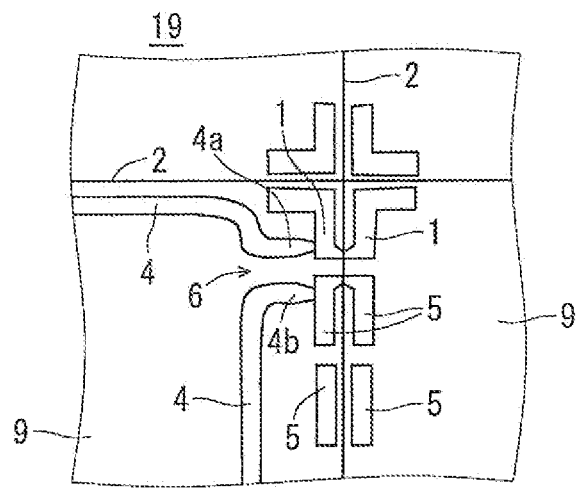
F I G . 4
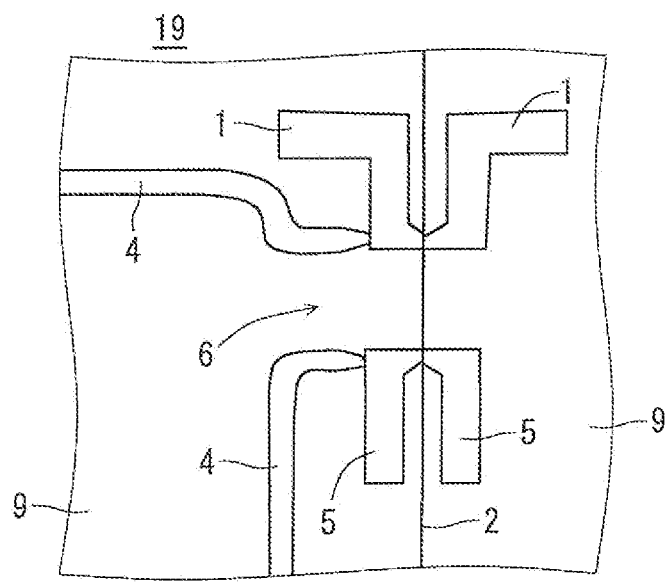

F I G . 9
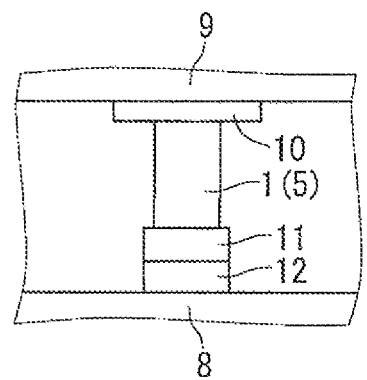

LIQUID CRYSTAL DISPLAY DEVICE AND METHOD OF MANUFACTURING LIQUID CRYSTAL DISPLAY DEVICE

CROSS-REFERENCE TO RELATED APPLICATIONS

The present application is a Divisional of U.S. patent application Ser. No. 14/223,993, filed on Mar. 24, 2014, which claims priority from Japanese Patent Application No. 2013-065415 filed Mar. 27, 2013.

BACKGROUND OF THE INVENTION

1. Field of the Invention

The present invention relates to a technique for manufacturing liquid crystal display devices with a slim bezel by surface close attachment.

2. Description of the Background Art

In most cases, when manufacturing liquid crystal display devices, a plurality of panels are provided on a single mother glass, and then divided into individual panels. In recent years, in order to eliminate generation of small scraps to simplify the manufacturing steps, and to make efficient use of the mother glass, it has become increasingly common to manufacture liquid crystal display devices by closely attaching adjacent panels (hereinafter referred to as "surface close attachment"). Further, a bezel region constituting a non-display region around a panel tends to be made slim, and so-called bezel slimming has been promoted.

In this manner, when panels are formed by surface close attachment and bezel slimming becomes advanced, a region for forming a transfer member and a sealing member provided on a bezel region (for the sealing member, especially protrusions in which an inlet is provided) as well as a margin of distance for a cutting line for separating between panels and for adjacent panels are reduced.

In addition, such a transfer member and a sealing member are both typically formed in such a manner that a paste material that has been applied is sandwiched between substrates and then spread therebetween, and therefore positions for formation and amounts of spread vary to a relatively large extent.

Therefore, it has become difficult to form a transfer member and a sealing member in a predetermined region of formation for these members without making their paste materials spread out of the region of formation. If the paste materials spread out over the cutting line for separating between panels or over an adjacent panel region, the glass substrate may be adhered (bonded) by the paste material at a portion not desired, resulting in wrong cutting.

As described above, in the case in which panels are formed by surface close attachment and with a slimmer bezel, probability of a wrong cutting due to spreading of the paste materials increases, and consequently it is difficult to manufacture liquid crystal display devices at a high yield ratio.

Thus, regarding the spreading out of paste materials, Japanese Patent Application Laid-Open No. 2003-215622, International Publication No. WO00/45360, and Japanese Patent Application Laid-Open No. 2006-268020, for example, disclose a method of forming a transfer member a within a predetermined region by enclosing a region of formation for a transfer member and a sealing member by a sealing member or a columnar spacer in a form of a bank.

Further, Japanese Patent Application Laid-Open No. 2001-166121 discloses provision of a cutting mark as an indication of a position for cutting, near an intersection between cutting lines.

However, according to the method described in Japanese Patent Application Laid-Open No. 2003-215622, when using the sealing member to form an enclosure for enclosing the transfer member, there is still a concern that the sealing member as the bank itself may spread out, and as a result, it is not possible to provide the transfer member near a cutting line, and a contribution of this method to bezel slimming is not that much.

Further, according to the method described in International Publication No. WO00/45360, when using a columnar spacer to form a projection for enclosing both the sealing member and the transfer member, an enclosure in a form of the bank is to be additionally provided around the sealing member only to prevent spreading out. Therefore, a region for forming an enclosure in a form of a bank itself increases, and a contribution of this method to bezel slimming is limited.

Moreover, according to the method described in Japanese Patent Application Laid-Open No. 2006-268020, when forming the transfer member and an enclosure using a columnar spacer for enclosing the transfer member inwardly from the sealing member for enclosing liquid crystals, there is a possibility that the transfer member is brought into contact with the liquid crystals while it is possible to prevent an unnecessary region from increasing in the outside of the sealing member. This results in a concern of a reduced yield ratio brought by factors such as display defects due to contamination of the liquid crystals.

Furthermore, as described in Japanese Patent Application Laid-Open No. 2001-166121, it is commonly employed to provide the cutting mark near the intersection between the cutting lines, and such a cutting mark is also formed in the case of surface close attachment and bezel slimming. However, the cutting mark is primarily provided as the indication of the position for cutting, and may not particularly affect spreading out of paste materials as typically formed by a thin film of a metal, a resin or the like. This means that the cutting mark described in Japanese Patent Application Laid-Open No. 2001-166121 may not solve the above problems.

As described above, there has not been proposed an effective method which may allow manufacturing of liquid crystal display devices with a sufficiently slim bezel both by surface close attachment and at a high yield ratio.

SUMMARY OF THE INVENTION

An object of the present invention is to provide a technique for manufacturing liquid crystal display devices with a slim bezel effectively at a high yield ratio by using surface close attachment.

A liquid crystal display device according to the present invention includes: a first substrate; a second substrate disposed at a position facing the first substrate; a transfer member provided at a corner portion in a bezel region of the first substrate and the second substrate; a spacer member for maintaining a distance between the first substrate and the second substrate within a predetermined range; and a cutting mark made of the same material as that of the spacer member, and disposed on the first substrate between a cutting line for the first substrate from a mother substrate and the transfer member.

According to the present invention, the cutting mark is made of the same material as that of the spacer member for maintaining the distance between the first substrate and the second substrate within a predetermined range, and formed between the cutting line and the transfer member on the first substrate, and accordingly provides a function as an indication for a position for cutting, as well as a function to prevent the transfer member from being spread out. Further, as the cutting mark holds a portion between the corner portion on a bezel region of first substrate and the cutting line, it is possible to provide stable cutting.

Providing the cutting mark having all of these functions eliminates necessity of increasing the number of the formation steps and increasing space for the corner portion on the bezel region of the first substrate, it is possible to manufacture the liquid crystal display device with a slim bezel more efficiently at a high yield ratio using surface close attachment.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating one example of a cutting assist pattern;

FIG. 4 is a diagram illustrating another example of the cutting assist pattern;

FIG. 9 is a diagram illustrating a layered structure of the cutting assist pattern.

DESCRIPTION OF THE PREFERRED EMBODIMENT

Preferred Embodiment

Figure 1:
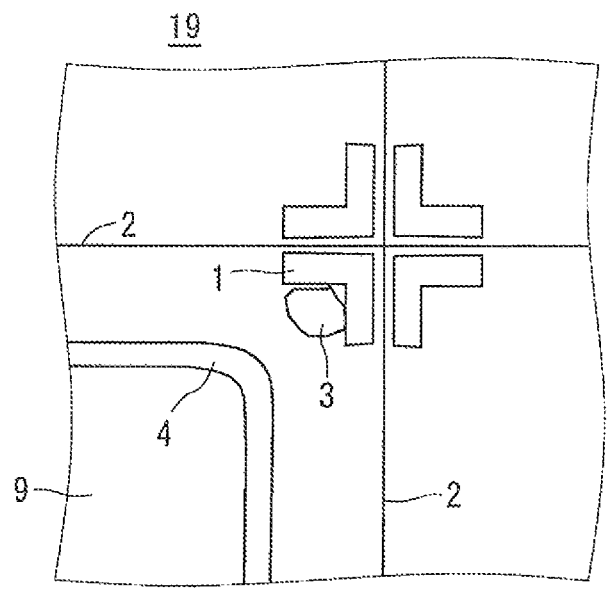
FIG. 1 is a diagram illustrating one example of cutting marks in a liquid crystal display device according to a preferred embodiment.

Hereinafter, a preferred embodiment of the present invention will be described with reference to the drawings. FIG. 1 is a diagram illustrating one example of cutting marks 1 in a liquid crystal display device according to the preferred embodiment. The figure is only schematically provided, and may not reflect an accurate size of illustrated components or the like. Further, for the sake of simplicity, a configuration other than major part of the present is omitted or partially simplified as needed. This also applies to the remaining figures. Moreover, throughout the drawings, like components illustrated in preceding figures are denoted by like reference numerals, and descriptions for such components shall be omitted when appropriate.

The liquid crystal display device is provided with, as a liquid crystal panel constituting the device, a TFT (Thin Film Transistor) liquid crystal panel of a dual-directional display type. FIG. 1 shows a mother color filter substrate (hereinafter referred to as "mother CF substrate") 19 in a manufacturing process of the liquid crystal panel before cutting, and a characteristic configuration of the present invention will be described with reference to FIG. 1.

The liquid crystal panel of the liquid crystal display device is provided with a color filter substrate (hereinafter referred to as "CF substrate") 9 as a first substrate, a switching device substrate (hereinafter referred to as "TFT substrate") 8 as a second substrate (see FIG. 6), the cutting marks 1, transfer members 3, and a seal pattern 4 (sealing member). In FIG. 1, illustration of the TFT substrate 8 is omitted, and details of this component will be described later.

The CF substrate 9 is one of substrates into which a mother CF substrate 19 (mother substrate) is separated, and cutting lines 2 are shown in the mother CF substrate 19. The cutting lines 2 are lines for cutting and separating the mother CF substrate 19 into the plurality of the CF substrates 9, and correspond to sides of the CF substrates 9. The transfer member 3 is formed, for example, by a resin in which electrically-conductive particles are mixed, and applied to (formed at) each corner of a bezel region 31 (see FIG. 6) of the CF substrate 9 and the TFT substrate 8. The seal pattern 4 is formed by a sealing member, at a region enclosing a display region 30 (see FIG. 6) of the CF substrate 9 and the TFT substrate 8.

The cutting mark 1 is formed between the cutting lines 2 and the transfer member 3 on the CF substrate 9. More specifically, the cutting mark 1 is formed in an L-shape at a region around an intersection between the cutting lines 2 so as to cut in between an applied portion of the transfer member 3 and the cutting lines 2. A cornered portion of the cutting mark 1 is positioned at a corner of the CF substrate 9. The cutting mark 1 is formed by the same material as that of columnar spacers 63 (more specifically, by an organic resin film) (see FIG. 6) that will be later described. In FIG. 1, the four CF substrates 9 and the four cutting marks 1 are shown.

The cutting lines 2 are pseudo lines, and practically not shown on the mother CF substrate 19. Each pair of the four cutting marks 1 is positioned in a line-symmetric manner vertically or horizontally in FIG. 1, and vertical and horizontal symmetry axes correspond to the cutting lines 2. Accordingly, the cutting lines 2 are considered to be positioned between the four cutting marks 1, and the substrate is cut taking the symmetry axes of the four cutting marks 1 as an indication. In other words, the cutting marks 1 serve as an indication for cutting.

Further, while details will be described later, a scribe line constituting a starting point for cutting is provided along each cutting line 2. The cutting marks 1 are provided on both sides of the scribe line, and can hold the CF substrate 9 from a back surface around the scribe line, and a force from teeth of a scribe wheel may be fully transferred to a front surface of the CF substrate 9. As a result, it is possible to achieve a depth of a groove of the scribe line that allows stable cutting. In other words, the cutting marks 1 also serve as a cutting assist pattern that allows stable cutting. In particular, as the corner portions are susceptible to wrong cutting such as cracking and chipping due to the cutting, an effect of capability of stabilizing the cutting by the provision of the cutting marks 1 is noticeable.

Moreover, by providing the cutting marks 1, the transfer members 3 that have been spread when applied and bonded are blocked by the cutting marks 1, and therefore may not be spread over the cutting line 2. Therefore, it is possible to obtain a liquid crystal display device without causing wrong cutting, such as cracking and chipping, due to the cutting caused by adhesion (bonding) between the TFT substrate 8 and the CF substrate 9 by the transfer members 3 at a region along the cutting lines 2 or over the cutting lines 2.

Figure 2:
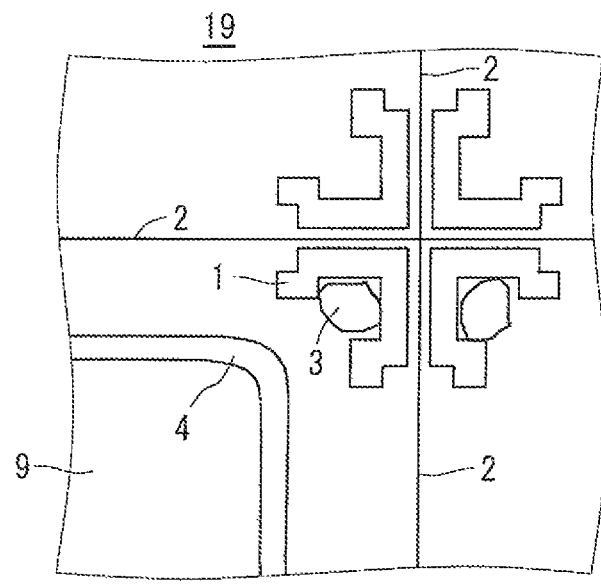
FIG. 2 is a diagram illustrating another example of the cutting marks.

Next, another example of the cutting marks 1 will be described. FIG. 2 is a diagram illustrating another example of the cutting marks 1. Referring to FIG. 2, each cutting mark 1 is formed so as to enclose the transfer member 3. More specifically, the cutting mark 1 is slightly modified such that the L-shape in FIG. 1 is provided with extensions (with additional walls in other directions than toward edges of the substrate with respect to the transfer member 3), so as to be able to further enclose the transfer member 3 as compared to that of the L-shape.

With this configuration, it is possible to prevent the transfer member 3 from being spread in other directions than toward the edges of the substrate as well. In other words, it is possible to more effectively prevent the transfer member 3 from being spread while still allowing the roughly L-shaped indication to function as the cutting assist pattern useful for forming the scribe line.

Next, a case in which a cutting assist pattern 5 is provided will be described. FIG. 3 is a diagram illustrating one example of the cutting assist pattern 5. Referring to FIG. 3, on the CF substrate 9, in addition to the L-shaped cutting marks 1, the cutting assist pattern 5 is provided at a predetermined distance from the cutting marks 1. Similarly to the cutting marks 1, the cutting assist pattern 5 is made of the same material as that of the columnar spacers 63 (more specifically, by an organic resin film). The cutting assist pattern 5 is formed in a shape of a dashed line along the cutting line 2, where sections of the pattern are positioned at predetermined intervals. Further, the cutting assist pattern 5 is provided along the cutting line 2 at a position closer to the cutting line 2 as compared to the seal pattern 4, and more specifically, at a position along the line apart from the cutting line 2 by a predetermined distance set within a range from 40 μm to 100 μm.

It should be noted that the cutting assist pattern 5 is not limited to the shape of the dashed line, and may be provided in a shape of a continuous straight line along the cutting line 2. However, if a completely closed space is formed in a plane pattern between the seal pattern 4 and the cutting assist pattern 5, a pressure difference typically occurs between an exterior and interior of the closed space in a transition between a vacuum state and a state in atmospheric pressure when injecting liquid crystals in manufacturing. This may result in a locally adverse effect to a gap between the TFT substrate 8 and the CF substrate 9 (gap between the substrates). Therefore, it is preferable that the cutting assist pattern 5 be provided with an opening at least a part of the pattern, including such an example in which the pattern is formed in the shape of the dashed line as in this preferred embodiment.

The seal pattern 4 is divided in two at the corner portion of the bezel region 31 of the CF substrate 9 and the TFT substrate 8, and includes a protrusion 4a protruding rightward in FIG. 3 and a protrusion 4b protruding rightward from the lower part in FIG. 3. A tip end of the protrusion 4a is in contact with the cutting mark 1, and a tip end of the protrusion 4b is in contact with the cutting assist pattern 5 adjacent to the cutting mark 1. Between the protrusions 4a and 4b at a predetermined interval, an inlet 6 for liquid crystals is defined. Therefore, the cutting mark 1 and the cutting assist pattern 5 adjacent to the cutting mark 1 can prevent the protrusions 4a and 4b from spreading out to the cutting line 2, and thus a liquid crystal display device may be obtained without causing wrong cutting such as cracking and chipping due to the cutting.

The cutting mark 1 is provided so as to continue to a different one of the cutting marks 1 provided for a different one of the CF substrates 9 of the mother CF substrate 19 adjacent across the cutting line 2 in a direction in which the protrusion 4a protrudes. The cutting assist pattern 5 adjacent to the cutting mark 1 is provided so as to continue to a different one of the cutting assist patterns 5 provided for the different one of the CF substrates 9. Specifically, a gap between a portion at which the adjacent cutting marks 1 are connected and a portion at which the adjacent cutting assist patterns 5 are connected is communicated with the inlet 6.

Further, the protrusions 4a and 4b do not serve as a guide for liquid crystals into the inlet 6 when injecting liquid crystals, as not reaching the edge of the substrate. Therefore, in this preferred embodiment, along with the protrusions 4a and 4b, the portion at which the adjacent cutting marks 1 are connected and the portion at which the adjacent cutting assist patterns 5 are connected serve as the guide for liquid crystals to be injected within the inlet 6.

Moreover, similarly to the cutting marks 1 shown in FIG. 1, the cutting marks 1 and the cutting assist patterns 5 are provided on both sides of the scribe line, and hold the CF substrate 9 from the back surface around the scribe line. Therefore, with the cutting marks 1 and the cutting assist patterns 5, a force from the teeth of the scribe wheel may be fully transferred to the front surface of the CF substrate 9, and it is possible to achieve a depth of the groove of the scribe line that allows stable cutting. In other words, the cutting marks 1 and the cutting assist patterns 5 also serve to prevent the protrusions 4a and 4b from being spread out, provide an indication for the position for cutting, and allow stable cutting. It should be noted that while not shown in FIG. 3, the transfer members 3 may be provided similarly to the cases of FIG. 1 and FIG. 2.

Next, another example of the cutting assist patterns 5 will be described. FIG. 4 is a diagram illustrating another example of the cutting assist patterns 5. Referring to FIG. 4, portions of the cutting marks 1 and the cutting assist patterns 5 that cross the cutting line 2, that is, the portion at which the adjacent cutting marks 1 are connected and the portion at which the adjacent cutting assist patterns 5 are connected are formed more thinly than the remaining portions of the cutting marks 1 and the cutting assist patterns 5. Accordingly, the connected portions may not disturb the cutting and the substrates are less susceptible to cracking. It should be noted that while not shown in FIG. 4, the transfer members 3 may be provided similarly to the cases of FIG. 1 and FIG. 2.

Figure 5:
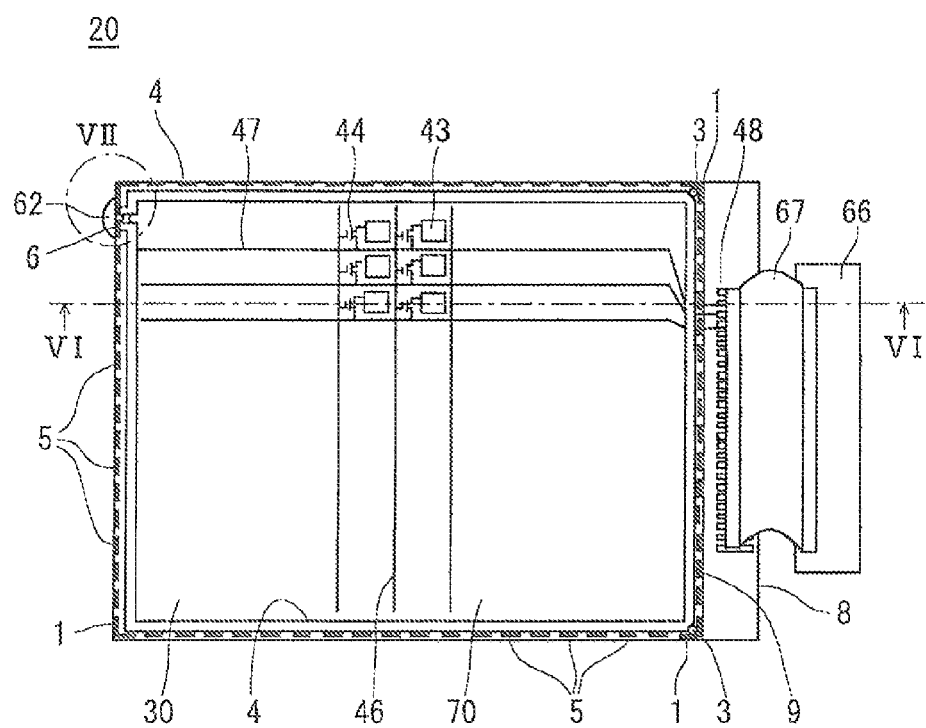
FIG. 5 is a plan view illustrating a liquid crystal panel of the liquid crystal display device.
Figure 6:
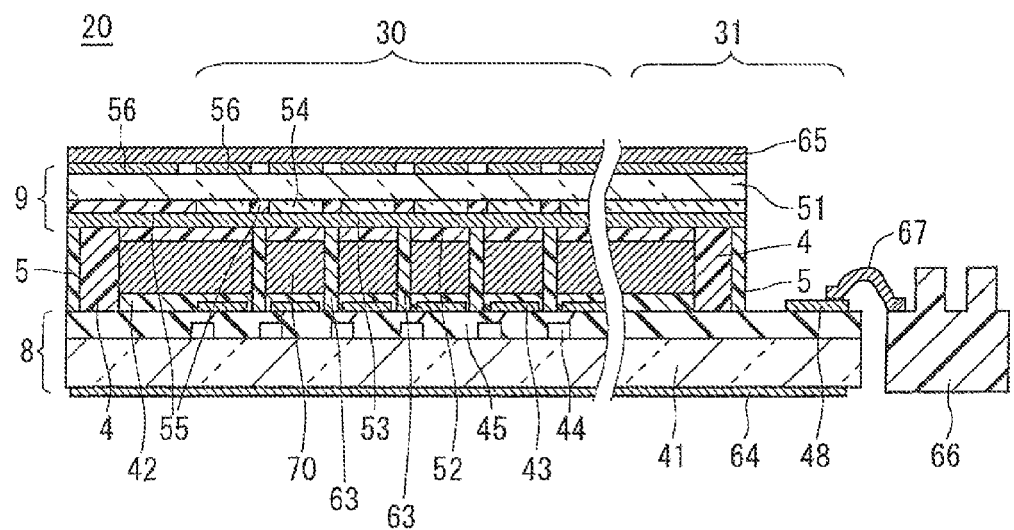
FIG. 6 is a sectional view taken along line VI-VI in FIG. 5.
Figure 7:
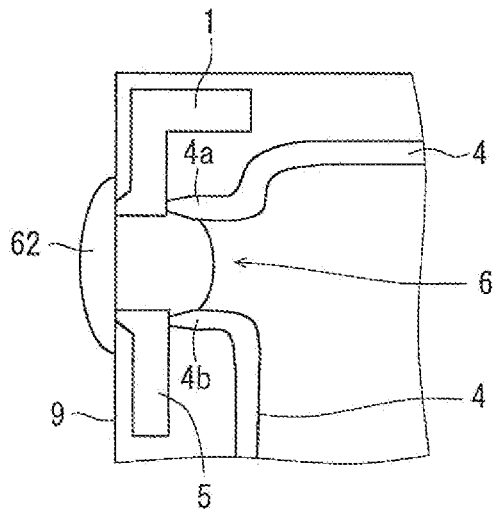
FIG. 7 is an enlarged view of a portion indicated by VII circled by an alternate long and short dash line in FIG. 5.

Next, a specific configuration and a manufacturing method of the liquid crystal display device will be described more in detail. First, a configuration of a liquid crystal panel 20 that constitutes the liquid crystal display device will be described with reference to FIG. 5 through FIG. 7. FIG. 5 is a plan view illustrating the liquid crystal panel 20 of the liquid crystal display device, FIG. 6 is a sectional view taken along line VI-VI in FIG. 5, and FIG. 7 is an enlarged view of a portion indicated by VII circled by an alternate long and short dash line in FIG. 5.

Referring to FIG. 5, the liquid crystal panel 20 is provided with the TFT substrate 8, the CF substrate 9, and the seal pattern 4. On the TFT substrate 8, TFTs as switching devices are arranged in an array, and a color filter and the like are provided on the CF substrate 9.

The seal pattern 4 is provided for the bezel region 31 so as to enclose at least the display region 30 between the TFT substrate 8 and the CF substrate 9, and seals the gap between the CF substrate 9 and the TFT substrate 8. The display region 30 is a region corresponding to a display screen in which an image is displayed when the liquid crystal panel 20 is operated. It should be noted that as the display region 30 and the bezel region 31, the region on the TFT substrate 8, the region on the CF substrate 9, and the region between the substrates 8 and 9 are wholly used, and the same is true throughout this description.

Between the TFT substrate 8 and the CF substrate 9, there are provided, within the display region 30, a large number of the columnar spacers 63 (spacer members) for forming and maintaining a gap of a certain range between the substrates 8 and 9, in other words, for maintaining a distance between the substrates 8 and 9 within a certain range. Further, as described above, the columnar spacers 63 are made of organic resin films, and the cutting assist patterns 5 and the cutting marks 1 on the bezel region 31 are also made of the same material as that of the columnar spacers 63. The cutting assist pattern 5 is formed in the shape of a dashed line along the edge of the CF substrate 9, that is, the cutting line, and the cutting marks 1 are provided at the corner portions of the substrate.

Moreover, as described above, during manufacturing, a different substrate adjacent to the CF substrate 9 across the cutting line on the first mother substrate is also provided with the cutting assist pattern 5 and the cutting marks 1. However, in FIG. 5 and FIG. 6, the cutting assist pattern 5 and the cutting marks 1 that are provided for the adjacent different liquid crystal panel or for small scraps of the substrate to be cut and removed are not shown as not constituting the liquid crystal panel 20.

A liquid crystal layer is formed by liquid crystals 70 (a liquid crystal material) sealed by the seal pattern 4 and sandwiched at least in the display region 30 within a gap between the CF substrate 9 and the TFT substrate 8 held by the columnar spacers 63. In addition, the seal pattern 4 is provided with the inlet 6 which is an opening for injecting the liquid crystals 70, and the inlet 6 is sealed by a sealing member 62 from outside the liquid crystal panel 20. In other words, the liquid crystal material is sealed within a region enclosed by the seal pattern 4. In this case, a TN (Twisted Nematic) liquid crystal material that is common as the liquid crystal material is used.

Further, as described with reference to FIG. 3 and FIG. 4, by bringing the tip ends of the protrusions 4a and 4b of the seal pattern 4 that define the inlet 6 into contact with the cutting mark 1 and the cutting assist pattern 5 made of the same material as that of the columnar spacer 63, it is possible to prevent the protrusions 4a and 4b of the seal pattern 4 from reaching the edge of the substrate. In other words, at the edge of the substrate, the inlet 6, the cutting mark 1, and the cutting assist pattern 5 serve as a guide when injecting the liquid crystals 70. However, as illustrated in FIG. 7, after injecting the liquid crystals 70, the sealing member 62 is pulled into the protrusions 4a and 4b of the seal pattern 4, and the inlet 6 is completely sealed by the protrusions 4a and 4b of the seal pattern 4 and the sealing member 62.

Next, the TFT substrate 8 and the CF substrate 9 will be described.

The TFT substrate 8 is provided with a glass substrate 41 formed by a transparent substrate of common glass with a thickness of about 0.7 mm. The TFT substrate 8 is further provided with an oriented film 42 for causing liquid crystals oriented on one side of the glass substrate 41, pixel electrodes 43 disposed under the oriented film 42 and configured to apply voltages for driving the liquid crystals, TFTs 44 as switching devices for supplying voltages to the pixel electrodes 43, an insulator film 45 covering the TFTs 44, a plurality of gate lines 46 and source lines 47 as lines for supplying signals to the TFTs 44, a signal terminal 48 for receiving signals supplied to the TFTs 44 from outside, transfer electrodes (not shown) for transmitting signals inputted through the signal terminal 48 to a common electrode 53, and the like. In addition, a polarizer plate 64 is disposed on the other side of the glass substrate 41.

The CF substrate 9 is provided with a glass substrate 51 formed by a transparent substrate of extremely-thin glass with a thickness of about 0.1 mm. The CF substrate 9 is further provided with an oriented film 52 for causing liquid crystals oriented on one side of the glass substrate 51, the common electrode 53 disposed above the oriented film 52 and configured to generate an electric field with the pixel electrodes 43 on the TFT substrate 8 to drive the liquid crystals, a black matrix (Black Matrix, or BM) 55 as a light shielding layer for shielding between color filters 54 disposed on the common electrode 53 or for shielding light to the bezel region 31 disposed outside a region corresponding to the display region 30, and the like. On the other side of the glass substrate 51, as a dual-directional display, a parallax barrier 56 is disposed which serves as a light shielding layer that divides the view into two directions. The parallax barrier 56 includes a slit opening at a position displaced from an opening of the BM 55 disposed within pixels to divide and limit the viewing directions. In addition, a polarizer plate 65 is disposed at the side outer than (above) the parallax barrier 56.

The color filters 54 are configured to serve as a filter that selectively transmits light in a specific range of wavelength such as red, green, or blue, by selecting a color material layer in which pigments are dispersed in a resin such that color material layers of different colors are arranged with regularity. In FIG. 5 and FIG. 6, the color filters 54 are shown as color filters of red, green, and blue, respectively. The BM 55 is also disposed on the bezel region 31 outside the display region 30, in addition to a region between the color filters 54. Specifically, the BM 55 is disposed substantially over an entire region of the bezel region 31 on the CF substrate 9, and shields light at the bezel region 31 in the CF substrate 9 unnecessary for display.

As the light shielding layer configured by the BM 55 and the parallax barrier 56, a material such as a metallic material using a film stack of chrome and chromic oxide, or a resin-based material in which black particles are dispersed in a resin may be selected. Note that an over-coating layer made of a transparent resin film may be provided below the oriented film 52, so as to cover the color filters 54 and the BM 55.

Further, the TFT substrate 8 and the CF substrate 9 are bonded together by the seal pattern 4, and held with a predetermined gap between the substrates by the columnar spacers 63 disposed in the display region 30. In addition, the transfer electrode and the common electrode 53 are electrically connected by the transfer member 3, through which a signal inputted from the signal terminal 48 is transmitted to the common electrode 53. The transfer member 3 is illustrated at each corner portion at right top and bottom in FIG. 5, and as described with reference to FIG. 1 and FIG. 2, disposed close to the inner side of the L-shaped cutting mark 1 made of the same material as that of the columnar spacers 63 such that the cutting mark 1 prevents the transfer member 3 from being spread toward the edge of the substrate more than required.

Moreover, the liquid crystal panel 20 is provided with a control board 66 for generating a drive signal, a FFC (Flexible Flat Cable) 67 that electrically connects the control board 66 with the signal terminal 48, a backlight unit as a light source (not shown here, while normally disposed to face a side of the TFT substrate 8 opposite from the CF substrate 9 side constituting the display screen), and the like. Along with these components, an outer portion of the CF substrate 9 in the display region 30 constituting the display screen is housed in an open casing (not shown), thereby constituting the liquid crystal display device.

The liquid crystal panel 20 that constitutes the liquid crystal display device described above is operated in the following manner. For example, upon input of an electrical signal from the control board 66, a drive voltage is applied to the pixel electrode 43 and the common electrode 53, and orientation of molecules of the liquid crystals 70 in the liquid crystal layer changes in accordance with the drive voltage. Then, by transmitting or blocking light emitted from the backlight unit to a side of a viewer through or by the TFT substrate 8, the liquid crystals 70, and the CF substrate 9, a video image or such is displayed in the display region 30 of the liquid crystal panel 20.

As the liquid crystal panel 20 that constitutes the liquid crystal display device is a dual-directional liquid crystal display panel, the parallax barrier 56 limits light transmitted through the CF substrate 9 to ranges of predetermined viewing angles in two directions. Specifically, the video image or such is displayed with effective ranges of viewing angles in two directions with respect to the display screen, toward left top and right top in FIG. 6. In addition, the liquid crystal display device serves as the dual-directional liquid crystal display panel in such a manner that display pixels are set for the liquid crystal display device corresponding to the effective ranges of viewing angles in two directions, and different video images are displayed for the effective ranges of viewing angles in two directions by performing different video display. As display features, the dual-directional liquid crystal display panel in particular using extremely-thin glass is superior in that a pixel pitch may be set small and the effective ranges of viewing angles in two directions may be more separately. Specifically, it is possible to be advantageously utilized in a case in which different high-resolution video images are displayed respectively for a plurality of viewers in the driver seat and the passenger seat in a car, for example.

Further, although the liquid crystal display device according to this preferred embodiment is a dual-directional liquid crystal display panel using extremely-thin glass that is susceptible to wrong cutting and with which it is difficult to provide a high yield ratio in manufacturing, it is possible to manufacture the liquid crystal display device according to this preferred embodiment at a high yield ratio as having characteristic configurations near the corner portions and the edge of the substrate of the liquid crystal panel 20.

As the above effects may be achieved significantly when the present invention is applied to a liquid crystal panel using extremely-thin glass, it is also possible to achieve the same effect with a curved liquid crystal display having a curved display screen using extremely-thin glass as well. In addition, while slightly less effective in the improvement of a yield ratio, it is possible to obtain the effect of the present invention in the reduction of wrong cutting for a normal liquid crystal display device not using extremely-thin glass, and the cutting marks 1 and the cutting assist patterns 5 of the present invention may be applied to such liquid crystal display devices.

Figure 8:
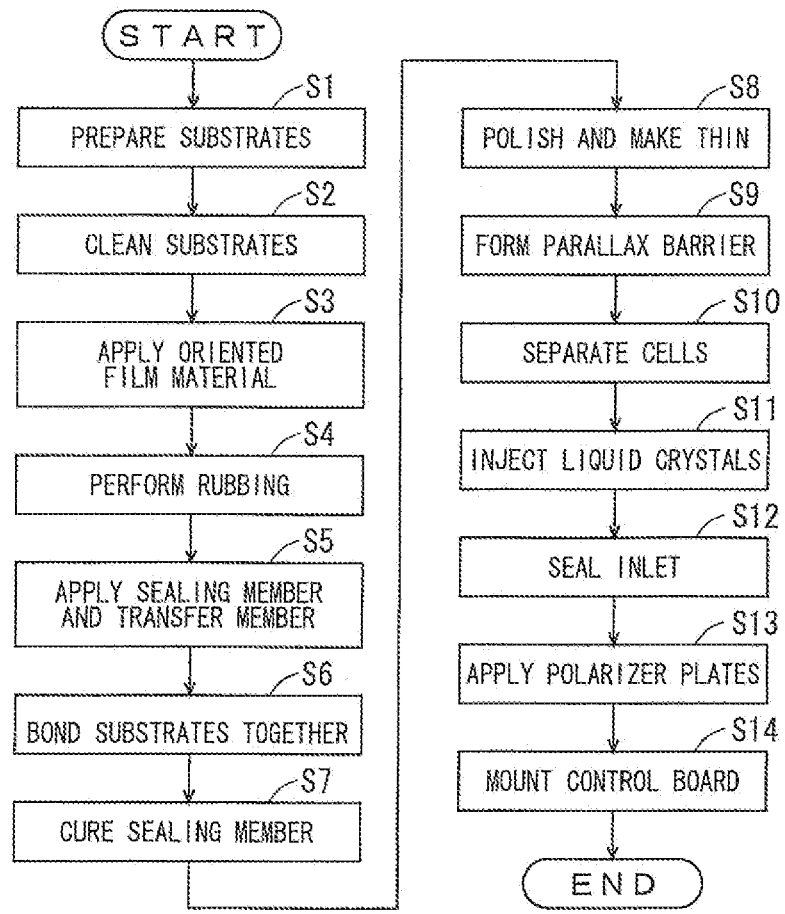
FIG. 8 is a flowchart showing steps for assembling the liquid crystal panel.

Next, a method of manufacturing the liquid crystal panel 20 that constitutes the liquid crystal display device according to the preferred embodiment will be described. Here, an outline of steps for assembling the liquid crystal panel 20 will be described with reference to a flowchart shown in FIG. 8. FIG. 8 is a flowchart showing the steps for assembling the liquid crystal panel 20.

First, in a substrate preparation step, a mother TFT substrate (not shown) for obtaining the TFT substrate 8 and the mother CF substrate 19 for obtaining the CF substrate 9 before bonded together are prepared (Step S1). While the CF substrate 9 is ultimately processed to extremely-thin glass by thinning process, a mother TFT substrate and the mother CF substrate 19 made of glass of thickness ranging from 0.5 mm to 1.5 mm are used in the process of the manufacturing steps before the thinning process in order to facilitate the following steps. Here, both the mother TFT substrate and the mother CF substrate 19 are prepared as substrates made of glass of thickness 0.7 mm.

A method of manufacturing the mother TFT substrate and the mother CF substrate 19 will be described only simply, as a common manufacturing method may be employed. First, the mother TFT substrate is manufactured by forming the TFTs 44 and the pixel electrodes 43, a line layer including the gate lines 46 and the source lines 47, the signal terminal 48, and the transfer electrode on the one side of the glass substrate 41 using a known manufacturing method, for example, by repeating a film formation and a pattern formation step such as patterning and etching based on the photolithographic approach.

Similarly, the mother CF substrate 19 is manufactured using a known manufacturing method, by forming the color filters 54, the BM 55, and the common electrode 53 on the one side of the glass substrate 51 by repeating a film formation step to the pattern formation step and then forming the columnar spacers 63 by patterning an organic resin film, for example. The cutting marks 1 and the cutting assist patterns 5 made of the same material as that of the columnar spacer 63, which are the characteristic configuration of the present invention, are formed at the same time as the columnar spacers 63, and only a change in a pattern design such as a plane arrangement needs to be made to the normal method of forming the columnar spacer 63. In other words, the method itself of forming the columnar spacers 63 may be common and known, and the mother CF substrate 19 may be manufactured employing a method within known manufacturing methods.

Then, in a substrate cleaning step, the mother TFT substrate thus prepared is cleaned (Step S2). Next, in an oriented film material application step, an oriented film material is applied and formed on one side of the mother TFT substrate (Step S3). In this step, for example, the oriented film material made of an organic film is applied using a printing method and dried by a baking treatment using a hot plate and such. Then, in a rubbing step, the oriented film material is subjected to rubbing and an alignment treatment is performed to a surface of the oriented film material, and thus the oriented film 42 is formed (Step S4).

Similarly to the Steps S2 to S4, on the mother CF substrate 19, the oriented film 52 is formed by cleaning, application of the oriented film material, and rubbing.

Subsequently, in a sealing member application step, using a screen printing machine, the sealing member in the form of a printing paste is applied to one side of the mother TFT substrate or the mother CF substrate 19, and the seal pattern 4 for ultimately enclosing the display region 30 is formed. Then, in a transfer member application step, the transfer member 3 in the form of a paste material made of a resin in which electrically-conductive particles are mixed is applied through a syringe nozzle and such to the one side of the mother TFT substrate or the mother CF substrate 19 (Step S5).

Thereafter, in a bonding attachment step, a cell substrate is formed by bonding the mother TFT substrate and the mother CF substrate 19 together (Step S6). At this time, the seal pattern 4 is sandwiched between the mother TFT substrate and the mother CF substrate 19, and a region for forming the sealing member in the form of a paste spreads. However, in the preferred embodiment, the cutting assist pattern 5 in a shape of a dashed line is provided between a position to be an edge of the substrate after separation in a subsequent step, i.e., between a position of the cutting line 2 and the region for forming the seal pattern 4, and in addition the cutting mark 1 and the cutting assist pattern 5 are provided between a position of the protrusions 4*a* and 4*b* of the seal pattern 4 forming the inlet 6 and the position of the cutting line 2. Therefore, it is possible to prevent infiltration of the sealing member caused by being spread on the position of the cutting line 2, or to an adjacent liquid crystal panel region across the cutting line 2.

Similarly, while the transfer member 3 in the form of a paste is sandwiched and spread between the mother TFT substrate and the mother CF substrate 19, in the preferred embodiment, the L-shaped cutting mark 1 is provided between the position of the cutting line 2 and the region for forming the transfer member 3, it is possible to prevent infiltration of the transfer member 3 caused by being spread on the position of the cutting line 2 or to the adjacent liquid crystal panel region across the cutting line 2.

Subsequently, in a sealing member curing step, in a state in which the mother TFT substrate and the mother CF substrate 19 are bonded together, the sealing member constituting the seal pattern 4 is completely cured (Step S7). This step is performed in accordance with the material of the sealing member, for example, by heating or ultraviolet irradiation. In a case in which the method of curing the sealing member by heating is selected, the cell substrate may be formed by continuously performing Steps S6 to S7, where the mother TFT substrate and the mother CF substrate 19 are bonded together and heated in succession (this process is also referred to as thermocompression bonding).

Then, in order to allow the liquid crystal panel 20 to be curved, or in order to form dual-directional liquid crystal display panel as in the case of the preferred embodiment, a polishing/thinning step is performed in which the glass substrate constituting at least one of the mother TFT substrate and the mother CF substrate is processed to extremely-thin glass by thinning, in the state where the mother TFT substrate and the mother CF substrate are bonded (Step S8).

Specifically, a thinning treatment by a chemical agent or mechanical polishing may be selected, and for example, if the chemical thinning treatment is used, in the case of making both the mother TFT substrate and the mother CF substrate 19 thin, after performing peripheral sealing to a peripheral portion of the mother TFT substrate and the mother CF substrate 19 to prevent the chemical agent from coming between the substrate and the substrate, the mother TFT substrate and the mother CF substrate 19 that have been bonded together as a whole are dipped in the chemical agent to polish surfaces of the mother TFT substrate and the mother CF substrate 19 to be made thinner. Further, when only one of the TFT substrate 8 and the CF substrate 9, for example, only the CF substrate 9 as in the case of the preferred embodiment is to be thinned, only the surface of the mother CF substrate 19 may be polished and thinned in a state in which a protective layer is formed over the surface of the mother TFT substrate by resist and such, in addition to the peripheral sealing.

Then, in a parallax barrier forming step, the parallax barrier 56 made of a light shielding layer serving as a dual-directional liquid crystal display panel is formed over the surface of the thinned mother CF substrate 19 (Step S9). Specifically, a metallic material using a film stack of chrome and chromic oxide or such depending on the material that forms the parallax barrier 56 is formed, and a patterning process in accordance with the material that forms the parallax barrier 56 is performed into a shape having slit openings at predetermined positions so as to serve as the parallax barrier 56. The film formation process of the metallic material is performed by sputtering together with heating of the substrates.

Next, in a cell separation step, the mother TFT substrate and the mother CF substrate 19 that have been boned together are separated into a large number of individual cells (Step S10). In this step, the large number of individual cells may be provided by, using a scribe wheel having V-shaped teeth, forming a scribe line constituting a starting point for cutting on the surface of the glass substrate 51, and then applying a stress to peripheral region of the scribe line for separation.

In the cell separation step, the cutting marks 1 made of the same material as that of the columnar spacers 63 serve as indications for specifying the positions for cutting and the corner portions. Further, both of the cutting marks 1 and the cutting assist patterns 5 are made of the same material as that of the columnar spacers 63, and are able to hold the CF substrate 9 from back side at the peripheral region on both sides of the scribe lines when forming the scribe lines.

Therefore, it is possible to appropriately apply the force of the teeth of the scribe wheel to the surface of the CF substrate 9 to form a scratch or a groove with a depth suitable for cutting. As a result, it is possible to carry out stable cutting without causing cracking and chipping, by the separation after a scribing step. This effect is noticeable in particular, when cutting the extremely-thin glass which is susceptible to deflection and not easily applied with a suitable force by scribing. As for the corner portions, as the seal pattern 4 is normally formed in a rounded shape (with corners rounded), the cutting lines 2 are formed relatively distant from the seal pattern 4. Therefore, when forming the scribe lines, the glass substrate is easily deflected and the force of the teeth of the scribe wheel is not easily transmitted at these portions. Accordingly, cracking and chipping occur particularly easily at the corner portion. In contrast, the cutting marks 1 provided at the corner portions exert such an effect that, even at the corner portions where the cutting lines 2 are formed relatively distant from the seal pattern 4 and the force of the teeth of the scribe wheel is not easily transmitted in nature, the cutting marks 1 hold the CF substrate 9 from the back side relatively near the cutting lines 2, and enable stable cutting without causing cracking and chipping. In other words, an improvement is significant in that the cutting becomes stable even at the corner portions where cracking and chipping occur particularly easily.

Further, as described above, due to the effect of the cutting marks 1 and the cutting assist patterns 5, in the bonding attachment step, it is possible to prevent infiltration of the paste materials of the sealing member and the transfer member caused by being spread on the positions of the cutting lines or to an adjacent liquid crystal panel region across the cutting lines. Thus, adjacent liquid crystal panels or small scraps to be removed may not be adhered (bonded)

to the liquid crystal panel 20 as an object to be cut due to the paste materials of the sealing member and the transfer member, and thus it is possible to provide stable cutting without causing cracking and chipping of glass due to spread of the paste materials. The effect of preventing cracking and chipping due to spread of the paste materials may be achieved regardless of the use of extremely-thin glass.

Next, in a liquid crystal injection step, liquid crystals are injected through the inlet of an individual cell (Step S11). This step is performed, for example, within a vacuum injection device in a vacuum state, by injecting or filling a liquid crystal material through the inlet by gradually increasing the pressure within the device to the atmosphere pressure while the inlet of the individual cell is brought into contact with the liquid crystal material.

Further, in an inlet sealing step, the inlet 6 is sealed (Step S12). This step is performed, for example, by sealing the inlet 6 with a light curing resin and irradiating the sealed portion with light. As described above, the liquid crystals are injected through a portion of the inlet 6 between the cutting mark 1 and the cutting assist pattern 5 that are in contact with the tip ends of the protrusions of the seal pattern 4, with the cutting mark 1 and the cutting assist pattern 5 as guides. In addition, in an inlet sealing step that follows, the sealing is performed by pulling the sealing member at least into a region between the protrusions of the seal pattern 4.

After separated into individual liquid crystal panels, filled with the liquid crystal material, and sealed in the manner described above, the polarizer plate 64 and the polarizer plate 65 are respectively applied to the surfaces of the TFT substrate 8 and the CF substrate 9 outside the cell substrate in a polarizer plate application step (Step S13), the control board 66 is mounted in a control board mounting step (Step S14), and then the liquid crystal panel 20 is completed. Subsequently, on the back side of the TFT substrate 8 which is to be non-visible side of the liquid crystal panel 20, a backlight unit is provided using an optical film such as a retarder, the liquid crystal panel 20 and peripheral components are housed appropriately within a frame of a resin or a metal, and thus the liquid crystal display device according to the preferred embodiment is completed.

In the preferred embodiment, as described above, as a part of the effects of the present invention is more noticeably achieved when using extremely-thin glass, the case in which the present invention is applied to the dual-directional liquid crystal display panel in which only one of the substrates is made of extremely-thin glass has been described. As the noticeable operations and effects described above are commonly achieved when at least one of the substrates is made of extremely-thin glass, this also applies to curved displays in which both of the TFT substrate and the CF substrate are made of extremely-thin glass, and reflective displays in which one of the substrates is made of extremely-thin glass.

As described above, according to the liquid crystal display device of the preferred embodiment, the cutting marks 1 are made of the same material as that of the columnar spacers 63 and formed between the cutting lines 2 and the transfer members 3 on the CF substrate 9, and accordingly provide a function as an indication for cutting positions, as well as a function to prevent the transfer member 3 from being spread out. Further, as the cutting marks 1 hold the portion between the corner portions on the bezel region 31 of the CF substrate 9 and the cutting line 2, it is possible to provide stable cutting.

Providing the cutting marks 1 having all of these functions eliminates necessity of increasing the number of the formation steps and increasing space for the corner portions on the bezel region 31 of the CF substrate 9, it is possible to manufacture the liquid crystal display device with a slim bezel more efficiently at a high yield ratio using surface close attachment. In addition, providing the cutting marks 1 is sufficient for obtaining the above effects, so that the manufacturing may be achieved with low costs.

As each cutting mark 1 is provided so as to enclose the transfer member 3, it is also possible to prevent the transfer member 3 from being spread in other directions than toward the edges of the substrate.

The liquid crystal display device further includes: the seal pattern 4 enclosing the display region 30 between the CF substrate 9 and the TFT substrate 8, and the cutting assist patterns 5 disposed on the CF substrate 9 along the cutting lines 2 with a predetermined distance from the cutting marks 1. The seal pattern 4 is separated so as to have the two protrusions 4a and 4b constituting the inlet 6 at the corner portion of the bezel region 31 of the CF substrate 9 and the TFT substrate 8, such that tip ends of the two protrusions 4a and 4b are brought into contact respectively with the cutting mark 1 and the cutting assist pattern 5.

Therefore, the cutting assist pattern 5 disposed along the cutting line 2 provides a function as an indication for the position for cutting. With the cutting marks 1 and the cutting assist patterns 5 adjacent to the cutting marks 1, it is possible to prevent the protrusions 4a and 4b from being spread out to the cutting line 2.

Further, as being made of the same material as that of the columnar spacer 63, the cutting assist pattern 5 holds a region along the cutting lines 2 which is closer to the cutting lines 2 than to the position of the seal pattern 4, and therefore it is possible to provide further stable cutting.

The cutting mark 1 and the cutting assist pattern 5 with which the tip ends of the two protrusions 4a and 4b are brought into contact are configured so as to be continuous respectively with the cutting mark 1 and the cutting assist pattern 5 provided for a different CF substrate 9 that is adjacent across the cutting line 2 in the mother CF substrate 19 before cutting, and portions provided across the cutting line 2 respectively of the cutting mark 1 and the cutting assist pattern 5 are configured more thinly than the remaining portions of the cutting mark 1 and the cutting assist pattern 5. Consequently, these portions may not disturb the cell separation step, and accordingly the substrates are less susceptible to cracking.

Further, at least one of the CF substrate 9 and the TFT substrate 8 is made of extremely-thin glass. As wrong cutting may not easily occur and manufacturing at a high yield ratio becomes possible by providing the cutting mark 1 and the cutting assist pattern 5, it is possible to mass-produce dual-directional display devices or curved display devices.

Moreover, in the preferred embodiment, a range of the thickness of substrates regarded as extremely-thin glass typically includes on the order of 0.1 mm and so described. However, a significant effect may be achieved with a substrate on the order of 0.2 mm, as compared to a liquid crystal display device using a glass substrate whose thickness is on the order of 0.3 mm used in common liquid crystal display devices. Further, a lower limit of this range is 0.01 mm, which is a lower limit of a glass substrate used in common liquid crystal display devices.

Thus, it is possible to achieve the same effect using, not limited to extremely-thin glass whose thickness is on the order of 0.1 mm as exemplified in the preferred embodiment, extremely-thin glass whose thickness is 0.01 mm or more and less than 0.2 mm.

As the cutting marks 1 or the cutting assist patterns 5 are formed at the same time as the columnar spacers 63, the cutting marks 1 and the cutting assist patterns 5 may be formed easily as it is possible to use a known method of forming the columnar spacers 63 that is commonly used.

It should be noted that the cutting mark 1 and the cutting assist pattern 5 with which the tip ends of the two protrusions 4a and 4b are brought into contact may be formed to have the same layered structure as that of the columnar spacers 63. This will be described with reference to FIG. 9. FIG. 9 is a diagram illustrating a layered structure of the cutting assist pattern 5.

Specifically, the columnar spacers 63 disposed on the display region 30 are typically provided for portions as light shielding regions where the gate lines on the TFT substrate 8 and the BM 55 on the CF substrate 9 overlap, and the cutting marks 1 and the cutting assist patterns 5 are made to have generally the same layered structure as that of the columnar spacers 63 disposed on the display region 30, by providing dummy patterns serving as a base for gap adjustment including a gate layer dummy pattern 10 made of the same material as that of and at the same time as the gate lines, a BM dummy pattern 12 made of the same material as that of and at the same time as the BM 55, and a color material dummy pattern 11 made of the same material as that of and at the same time as the color material layer (the color filter 54).

With this, it is possible to make a gap between the substrates 8 and 9 for the display region 30, a gap between the substrates 8 and 9 for the cutting marks 1, and a gap between the substrates 8 and 9 for the cutting assist pattern 5 substantially equal, and thus the gap between the TFT substrate 8 and the CF substrate 9 becomes substantially identical with the height of the cutting mark 1 and the cutting assist pattern 5. Accordingly, the cutting mark 1 and the cutting assist pattern 5 are brought into contact with and generally closely attached to the surfaces of the substrates 8 and 9. As a result, it is possible to prevent air from intruding when injecting liquid crystals, thus to provide more stable injection of liquid crystals.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device, comprising:
   a first substrate;
   a second substrate disposed at a position facing said first substrate;
   a transfer member provided at a corner portion in a bezel region of said first substrate and said second substrate;
   a spacer member for maintaining a distance between said first substrate and said second substrate within a predetermined range; and
   a cutting mark made of the same material as that of said spacer member, disposed on said first substrate between a cutting line for the first substrate from a mother substrate and said transfer member, and holding said first substrate from a back surface side around a scribe line when said scribe line is provided to cut said first substrate from said mother substrate,
   wherein a sealing member encloses a display region between said first substrate and said second substrate, said transfer member is provided at a spaced distance apart from said sealing member, and said transfer member is provided between said sealing member and said cutting line,
   said transfer member connects a common electrode and a transfer electrode positioned outside the sealing member, and
   said cutting mark has an open part to open a part in which the transfer member faces the sealing member.

2. The liquid crystal display device according to claim 1, wherein
   said cutting mark is provided so as to enclose said transfer member.

3. The liquid crystal display device according to claim 1, wherein
   said cutting mark is configured by the same layered structure as that of said spacer member and has the same height as that of said spacer member, and
   said layered structure comprises a plurality of different layers.

4. The liquid crystal display device according to claim 1, wherein
   at least one of said first substrate and said second substrate is made of extremely-thin glass.

* * * * *